United States Patent
Porte

(10) Patent No.: US 7,621,371 B2
(45) Date of Patent: Nov. 24, 2009

(54) METHOD FOR ATTENUATING THE NOISE OF A TURBOFAN

(75) Inventor: Alain Porte, Colomiers (FR)

(73) Assignee: Airbus France, Toulouse (FR)

( * ) Notice: Subject to any disclaimer, the term of this patent is extended or adjusted under 35 U.S.C. 154(b) by 8 days.

(21) Appl. No.: 12/066,476

(22) PCT Filed: Sep. 1, 2006

(86) PCT No.: PCT/FR2006/002016
§ 371 (c)(1),
(2), (4) Date: Mar. 11, 2008

(87) PCT Pub. No.: WO2007/031618
PCT Pub. Date: Mar. 22, 2007

(65) Prior Publication Data
US 2008/0202847 A1    Aug. 28, 2008

(30) Foreign Application Priority Data
Sep. 12, 2005  (FR) ................................ 05 09260

(51) Int. Cl.
*F02K 1/40* (2006.01)
(52) U.S. Cl. .................. 181/213; 181/210; 181/216; 244/1 N; 60/226.1
(58) Field of Classification Search .......... 181/210, 181/213, 216; 244/1 N; 60/226.1
See application file for complete search history.

(56) References Cited

U.S. PATENT DOCUMENTS

| | | | | |
|---|---|---|---|---|
| 4,826,106 A | * | 5/1989 | Anderson | 244/117 R |
| 6,360,528 B1 | * | 3/2002 | Brausch et al. | 60/262 |
| 6,532,729 B2 | * | 3/2003 | Martens | 60/204 |
| 6,751,944 B2 | * | 6/2004 | Lair | 60/226.3 |
| 6,971,229 B2 | * | 12/2005 | Lair | 60/226.1 |
| 2002/0125340 A1 | * | 9/2002 | Birch et al. | 239/265.11 |

FOREIGN PATENT DOCUMENTS

| | | | |
|---|---|---|---|
| GB | 766 985 | | 1/1957 |
| GB | 768 553 | | 2/1957 |
| GB | 2 289 921 | | 12/1995 |
| GB | 2372779 A | * | 9/2002 |
| WO | 02/29232 | | 4/2002 |

OTHER PUBLICATIONS

International Search Report dated Dec. 11, 2006 w/ English translation.
Written Opinion of the ISA w/ English translation.

* cited by examiner

*Primary Examiner*—Jeffrey Donels
*Assistant Examiner*—Jeremy Luks
(74) *Attorney, Agent, or Firm*—Dickinson Wright PLLC

(57) ABSTRACT

A jet engine includes a hollow nacelle including a front air intake section and a rear air outlet section having outer and inner annular surfaces which converge to form a trailing edge. A fan opposite the front air intake section to generate a cold stream. A generator downstream of the fan, to generate an axial hot stream. A cowl system including a rear section with outer and inner annular surfaces which converge to form an outlet orifice for the hot stream. The trailing edge of the nacelle forms the outlet orifice for the cold stream. Blind notches attenuate the jet noise at the periphery of the outlet orifice for at least one of the streams. The notches cut into one of the convergent annular surfaces forming the outlet orifice without cutting into the other of the convergent annular surfaces.

8 Claims, 4 Drawing Sheets

METHOD FOR ATTENUATING THE NOISE OF A TURBOFAN

FIELD OF THE INVENTION

The present invention relates to a method for attenuating the jet noise of a turbofan engine and to a turbofan engine whose noise is attenuated by implementing the method.

BACKGROUND OF THE RELATED ART

It is known that, at the rear of a turbofan engine, the cold stream (bypass stream) and the hot stream (core stream) flow in the same direction downstream of said turbofan engine and come into contact, not only with one another, but also with the ambient air. Since the velocities of said streams differ from one another and from the ambient air velocity, penetrating fluid shearing actions result between said streams and between the latter and the ambient air, said fluid shearing actions generating noise, referred to as "jet noise" in the aeronautical field.

To attenuate such jet noise, it has already been considered to generate turbulence at the boundaries between the fluids having different velocities. It has thus already been proposed to make notches in the outlet edge for the hot stream and/or in the outlet edge for the cold stream (see, for example, GB-2 289 921). Such notches are distributed around the periphery of said outlet edge and each of them generally has the at least approximate shape of a triangle whose base is coincident with the corresponding outlet edge and whose vertex is situated in front of this outlet edge. These notches are generally referred to as "chevrons" in the aeronautical field. Of course, said "chevrons" are in pairs separated by a "protuberance".

These known notches and protuberances are effective in attenuating the jet noise; however, they have the drawback of generating considerable drag.

Moreover, document GB-2 372 779 states that jet noise attenuation is not necessary in cruising flight and that, consequently, it is advantageous, in particular as far as drag is concerned, to make said protuberances movable so that they can adopt:

either a projecting deployed position, used on take-off and landing, in which they are able to attenuate the jet noise;

or a retracted position, used in cruise, in which they exert no jet noise attenuation action.

To achieve this, GB-2 372 779 discloses that said outer annular surface or said inner annular surface of said rear section of the cowl surrounding the hot stream generator is made partially movable through the action of an actuating mechanism specially provided for this purpose. It will be noted that, when said protuberances are in the deployed position, the notches are through-going (not closed off by the annular surface which does not bear the notches) and that, when said protuberances are in the retracted position, said notches are blind (closed off by that one of said annular surfaces which does not bear the notches).

Thus, the technical lesson given by document GB-2 372 779 contains the following two propositions:

a) jet noise attenuation is obtained only with through-going notches; and b) no jet noise attenuation is possible if the notches are blind.

SUMMARY OF THE INVENTION

Hence, the object of the present invention is to overcome the drawbacks of the prior art cited above by providing notches which are as effective as the known chevrons as far as jet noise attenuation is concerned, but which generate much less drag, and which make it possible to obtain the desired jet noise attenuation without the complications or increases in mass resulting from:

the partial movability required of an annular surface of the rear section of the cowl surrounding the hot stream generator; and a special mechanism for actuating the movable section of said annular surfaces.

To this end, according to the invention, the method for attenuating the jet noise of a turbofan engine comprising:

a hollow nacelle having a longitudinal axis and including a front air intake section, provided with a leading edge, and a rear air outlet section comprising an outer annular surface and an inner annular surface which converge toward one another to form a trailing edge;

a fan arranged in said nacelle opposite said front air intake section and designed to generate the cold stream of said turbofan engine;

a generator arranged in said nacelle, downstream of said fan, and designed to generate the axial hot stream of said turbofan engine; and a cowl system surrounding said hot stream generator and including a rear section which comprises an outer annular surface and an inner annular surface which converge toward one another to form an outlet orifice for said hot stream, said cowl system defining with the nacelle a duct of annular cross section for said cold stream, and said duct being terminated by said rear air outlet section of the nacelle whose trailing edge forms the outlet orifice for said cold stream, which method involves producing notches designed to attenuate the jet noise of said turbofan engine at the periphery of the outlet orifice for at least one of said streams, is noteworthy in that said notches are produced so as to be blind, given that they cut into one of said convergent annular surfaces forming said outlet orifice without cutting into the other of said convergent annular surfaces.

Specifically, the Applicant has surprisingly found, contrary to the teaching of document GB-2 372 779, that fixed blind notches were able to achieve the desired jet noise attenuation, with a reduction in drag.

According to other distinctive features of the invention, depending on the characteristics of the turbofan engine in question:

the blind notches can cut into said outer annular surface without cutting into said inner annular surface or else, by contrast, they can cut into said inner annular surface without cutting into said outer annular surface; and only the outlet orifice for the hot stream is provided with said blind notches or else, by contrast, only the outlet orifice for the cold stream is provided with said blind notches; unless the outlet orifice for the hot stream and the outlet orifice for the cold stream are both provided with such blind notches.

In the usual case where said cowl system has ventilating air flowing through it that is intended to regulate the temperature of said hot stream generator, this ventilating air can escape in full through said blind notches provided in the edge of the outlet orifice for the hot stream. However, this edge can, in a known manner, include a peripheral escape gap, the ventilating air then escaping only partially through said notches adjacent to said gap.

Moreover, in a known manner, the outlet orifice in question can be defined by an annular capping piece to which said convergent outer and inner annular surfaces are secured. It is then advantageous for said blind notches to be formed by cutouts made in one of the faces of said capping piece.

BRIEF DESCRIPTION OF THE DRAWINGS

The figures of the appended drawing will give a clear understanding of how the invention can be implemented. In these figures, identical references denote like elements.

DETAILED DESCRIPTION OF THE INVENTION

Figure 1:
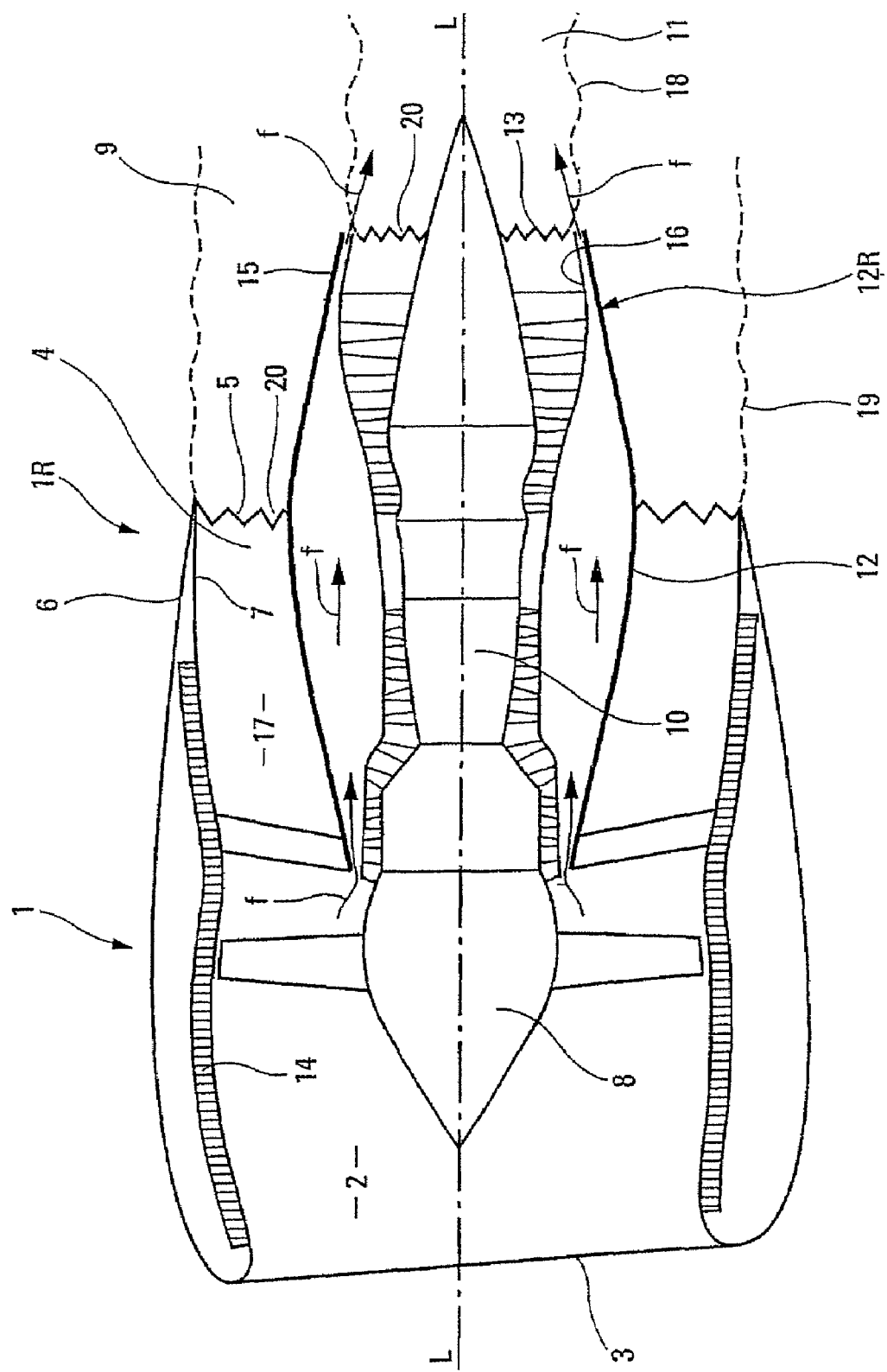
FIG. 1 represents, in schematic axial section, a known turbofan engine intended to be improved by implementing the method of the present invention.

The turbofan engine of known type, shown in FIG. 1, includes a hollow nacelle 1, of longitudinal axis L-L, including, at the front, an air intake 2 provided with a leading edge 3 and, in its rear section 1R, an annular air outlet 4 provided with a trailing edge 5. The rear section 1R comprises an outer annular surface 6 and an inner annular surface 7 which converge toward one another to form said trailing edge 5.

Inside said hollow nacelle 1 are arranged the following:
a fan 8 directed toward the air intake 2 and designed to generate the cold stream 9 for the turbofan engine;
a central generator 10 comprising, in a known manner, low-pressure and high-pressure compressors, a combustion chamber and low-pressure and high-pressure turbines, this generator generating the hot stream 11 of said turbofan engine;
a cowl system 12 surrounding said hot stream generator 10 and provided, in its rear section 12R, with an outlet edge 13 for the hot stream 11; and
acoustic attenuation linings 14 intended to absorb the internal noise generated by the fan 8 and the hot stream generator 10.

The rear section 12R of the cowl system 12 comprises an outer annular surface 15 and an inner annular surface 16 which converge toward one another to form said outlet edge 13 for the hot stream 11. Furthermore, said cowl system 12 defines with the nacelle 1 an internal duct 17 of annular cross section that ends at the air outlet 4. The cold stream passes through the internal duct 17 and the outlet 4 and exits through the trailing edge 5, serving as the outlet edge of said outlet.

Thus, on exiting this known turbofan engine, the central hot stream 11 is surrounded by the annular cold stream 9, which penetrates the ambient air. FIG. 1 schematically shows the boundary 18 between the hot stream and the cold stream 9, and the boundary 19 between the cold stream 9 and the ambient air. It goes without saying that, at the boundaries 18 and 19, the fluids in contact have different velocities, thus generating the jet noise described above.

To attenuate this jet noise, the outlet edge 13 for the hot stream and/or the outlet edge 5 for the cold stream are provided, in a known manner, with notches 20 distributed around their periphery. These notches 20 pass through the full thickness of said outlet edges 13, 5 and generate considerable drag.

In order to overcome the latter drawback, the present invention does without the through-going notches 20, as is represented in FIGS. 2 to 10.

Figure 2:
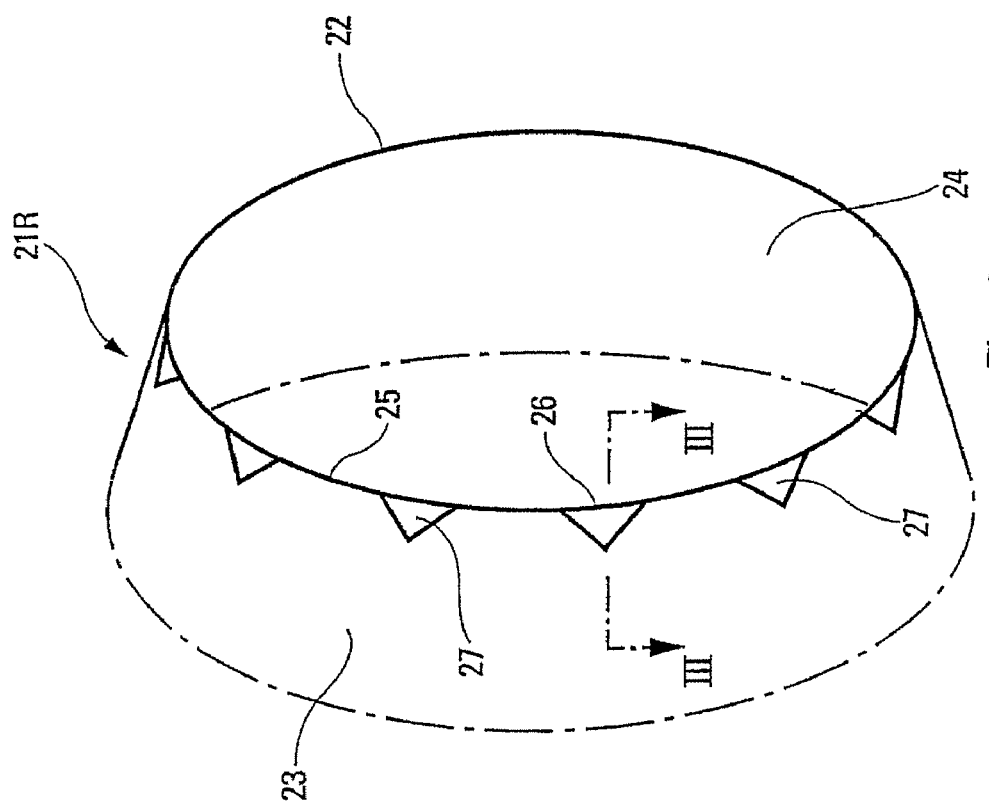
FIG. 2 illustrates, in schematic perspective, a first embodiment for the outlet edge for a stream of a turbofan engine improved according to the invention.
Figure 3:
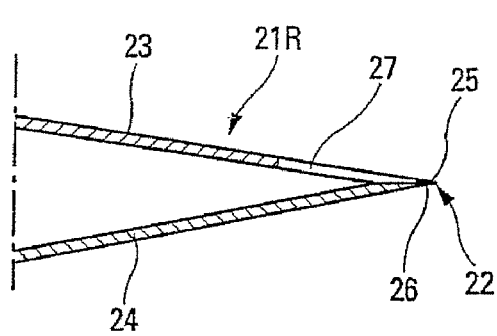
FIG. 3 is a schematic section on line III-III in FIG. 2.

FIGS. 2 and 3 represent a first embodiment of a rear section 21R with an outlet orifice 22, designed to improve, according to the invention, one or other of the rear sections 1R and 12R.

The rear section 21R shown in FIGS. 2 and 3 includes an outer annular surface 23 (comparable to the outer annular surfaces 6 and 15) and an inner annular surface 24 (comparable to the inner annular surfaces 7 and 16) which converge at the edge of the outlet orifice 22 and which are assembled with one another along their rear edges 25 and 26 to form said outlet orifice 22.

Notches 27 are cut in the rear edge 25 of the outer surface 23 and these notches are adjacent to the edge of the outlet orifice 22 and extend into said outer surface 23, away from said outlet orifice 22.

It can thus be seen that the notches 27 are blind, since they are closed off by the inner surface 24, and that, on the inner side, said rear section 21R is smooth since it is formed by the unnotched inner surface 24.

Figure 4:
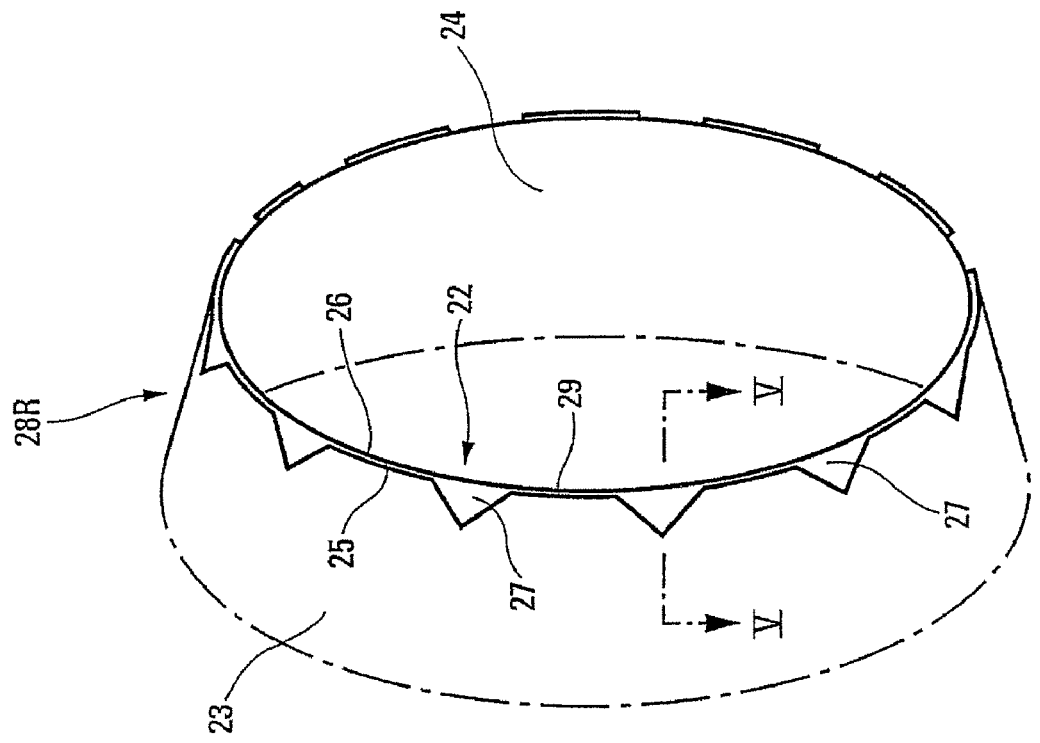
FIG. 4 illustrates, in schematic perspective, a second embodiment for the outlet edge for a stream of a turbofan engine improved according to the invention.
Figure 5:
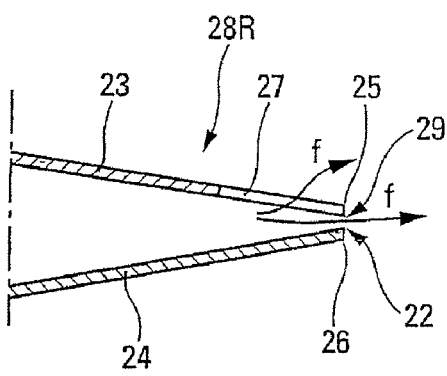
FIG. 5 is a schematic section on line V-V in FIG. 4.

Moreover, as is illustrated in FIG. 1 by the arrows f, the hot stream generator 10 can be ventilated by air circulating in said cowl system 12, said ventilating air being bled from the cold stream and being able to exit said cowl in the vicinity of the outlet edge 13. When the rear section 12R is replaced by the rear section 21R shown in FIGS. 2 and 3, the ventilating air is thus caused to exit through the notches 27. Should these notches be insufficient to provide said ventilating air with a free flow, it is possible, as represented in FIGS. 4 and 5, to use a rear section 28R which is identical in all aspects to the rear section 21R, except for the fact that the outer and inner surfaces 23, 24 are no longer secured to one another by their rear edges 25, 26, along the edge of the outlet orifice 22. Specifically, a peripheral gap 29 surrounding said outlet orifice 22 is then formed between the rear edges 25 and 26 of the outer and inner surfaces 23, 24.

In this way, the flow area for the air used to ventilate the generator 10 is increased.

Figure 7:
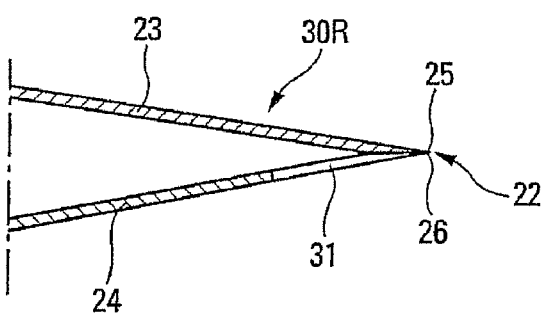
FIG. 7 is a schematic section on line VII-VII in FIG. 6.
Figure 6:
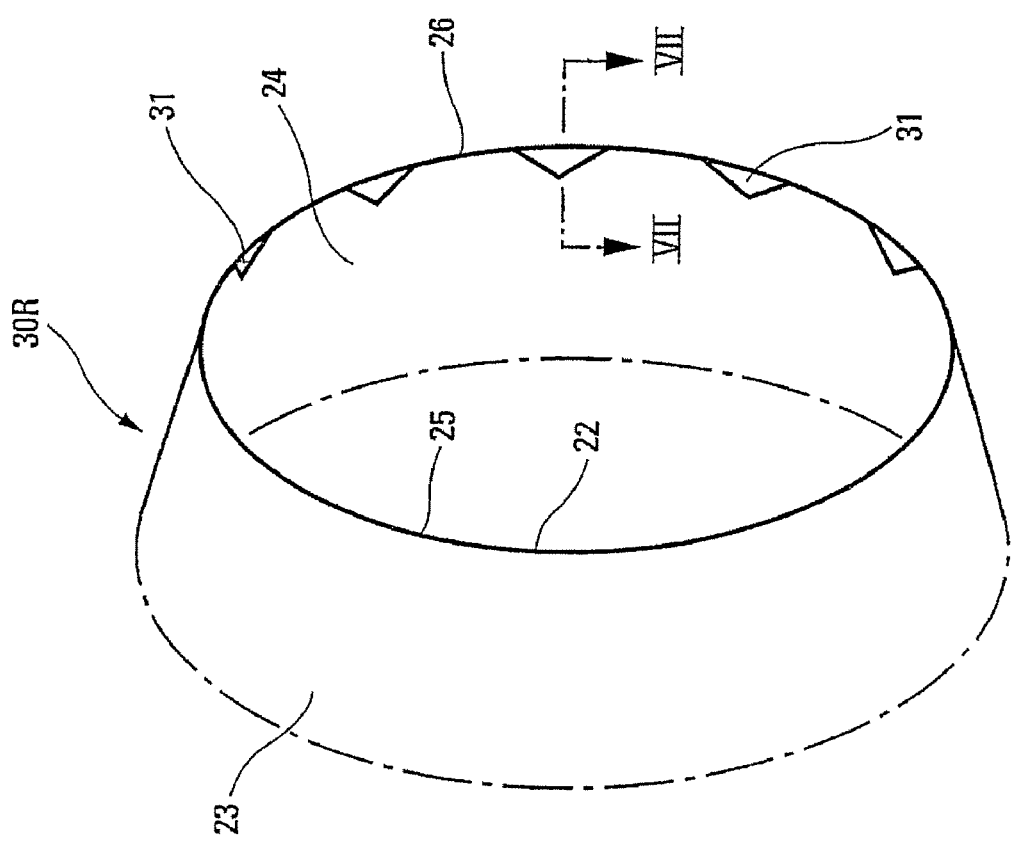
FIG. 6 illustrates, in schematic perspective, a third embodiment for the outlet edge for a stream of a turbofan engine improved according to the invention.

FIGS. 6 and 7 show a rear section 30R similar to the rear section 21R represented in FIGS. 2 and 3, except for the fact that the notches 27 in the edge 25 of the outer surface 23 are omitted and replaced by similar notches 31 cut in the edge 26 of the inner surface 24.

In an obvious manner, the notches 31 are blind, since they are closed off by the outer surface 23.

Figure 9:
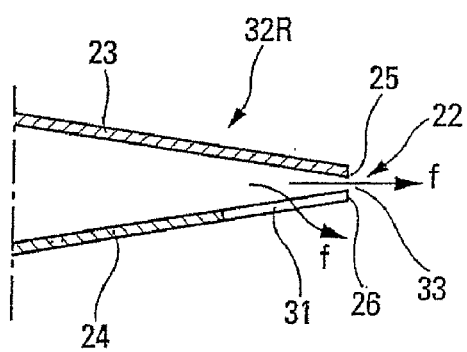
FIG. 9 is a schematic section on line IX-IX in FIG. 8.
Figure 8:
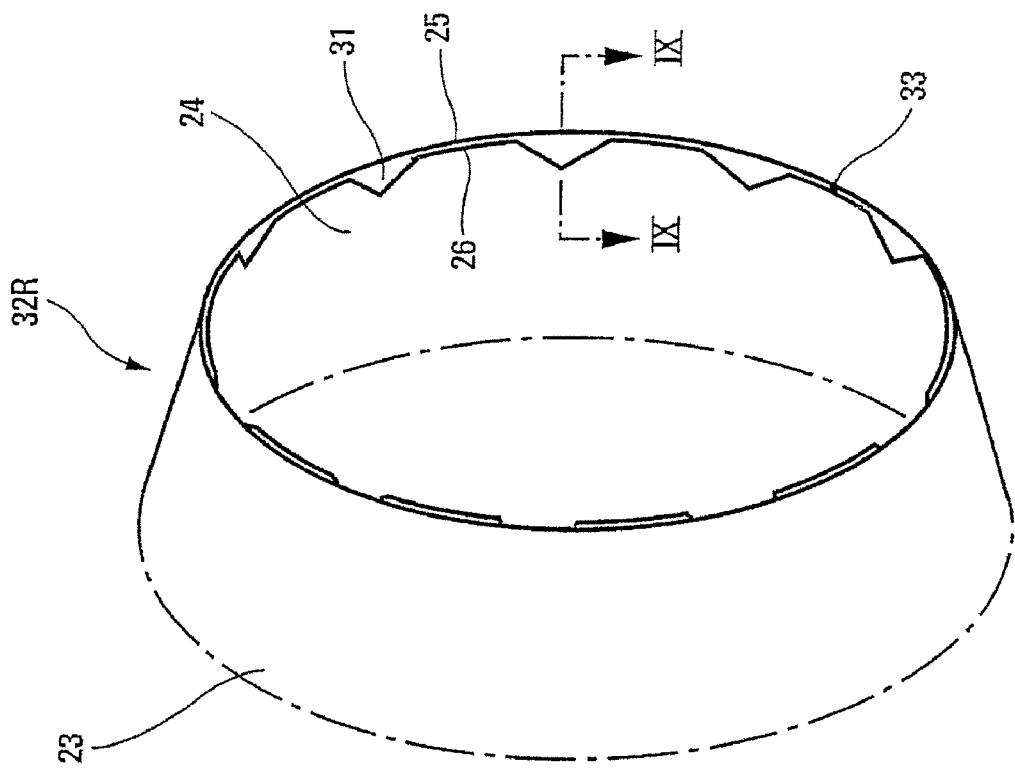
FIG. 8 illustrates, in schematic perspective, a fourth embodiment for the outlet edge for a stream of a turbofan engine improved according to the invention.

Similarly, FIGS. 8 and 9 show a rear section 32R similar to the rear section 28R represented in FIGS. 4 and 5, from which the notches 27 have been omitted and replaced by the notches 31 of the rear section 30R represented in FIGS. 6 and 7. Thus, a peripheral gap 33 is formed between the rear edges 25 and 26.

Figure 10:
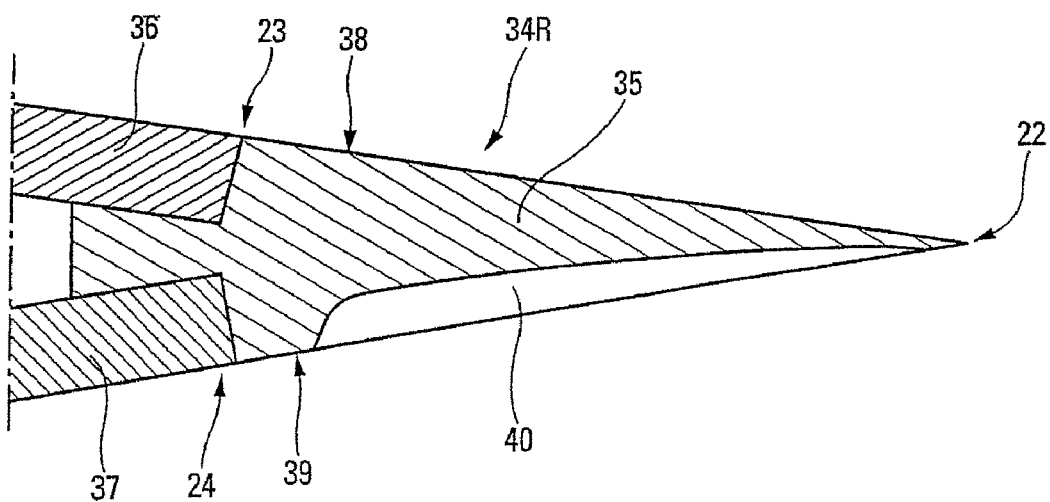
FIG. 10 shows schematically in section a practical embodiment for the variants shown in FIGS. 2, 3, 6 and 7.

FIG. 10 illustrates a practical embodiment 34R of the rear sections 21R and 30R shown in FIGS. 2, 3 and 6, 7.

In the rear section 34R is provided a capping piece 35 forming the outlet orifice 22, to which are affixed plates or sheets 36, 37 forming the surfaces 23, 24 in collaboration with the planar faces 38 and 39 of said capping piece 35. Blind cutouts 40, representative of the notches 27, 31, are cut in one of the faces 38, 39 of said capping piece 35.

It will readily be understood from the description above that the blind notches according to the present invention can result from perforations, cutouts, indentations, stamping, undercutting or any other forming or machining operation.

The invention claimed is:

1. A method for attenuating the jet noise of a turbofan engine comprising:
   a hollow nacelle having a longitudinal axis and including a front air intake section, provided with a leading edge, and a rear air outlet section comprising an outer annular surface and an inner annular surface which converge toward one another to form a trailing edge;
   a fan arranged in said nacelle opposite said front air intake section and designed to generate the cold stream of said turbofan engine;
   a generator arranged in said nacelle, downstream of said fan, and designed to generate the axial hot stream of said turbofan engine; and
   a cowl system surrounding said hot stream generator and including a rear section which comprises an outer annular surface and an inner annular surface which converge toward one another to form an outlet orifice for said hot stream, said cowl system defining with the nacelle a duct of annular cross section for said cold stream, and said duct being terminated by said rear air outlet section of the nacelle whose trailing edge forms the outlet orifice for said cold stream,
   which method involves producing notches designed to attenuate the jet noise of said turbofan engine at the periphery of the outlet orifice for at least one of said streams, wherein said notches (27, 31, 40) are produced so as to be blind, given that they cut into one of said convergent annular surfaces forming said outlet orifice without cutting into the other of said convergent annular surfaces.

2. The method as claimed in claim 1, wherein said blind notches (27, 40) cut into said outer annular surface without cutting into said inner annular surface.

3. The method as claimed in claim 1, wherein said blind notches (31, 40) cut into said inner annular surface without cutting into said outer annular surface.

4. The method as claimed in claim 1, wherein the outlet orifice for the hot stream is provided with said blind notches (27, 31, 40).

5. The method as claimed in claim 1, wherein the outlet orifice for the cold stream is provided with said blind notches (27, 31, 40).

6. The method as claimed in claim 4, wherein the outlet orifice for the hot stream and the outlet orifice for the cold stream are provided with said blind notches (27, 31, 40).

7. The method as claimed in claim 4, applied to a turbofan engine in which said cowl system has ventilating air flowing through it that is intended to regulate the temperature of said hot stream generator, wherein said ventilating air escapes at least in part through said blind notches (27, 31).

8. A turbofan engine for implementing the method specified in claim 1, in which the outlet orifice for said stream is defined by a capping piece secured to said convergent outer and inner annular surfaces, wherein said blind notches (27, 31) are formed by cutouts made in one of the faces of said capping piece.

* * * * *